United States Patent
Wehrmann et al.

(10) Patent No.: US 7,399,820 B2
(45) Date of Patent: Jul. 15, 2008

(54) CYCLIC OLIGOFORMALS IN POLYCARBONATE

(75) Inventors: Rolf Wehrmann, Krefeld (DE); Helmut-Werner Heuer, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 55 days.

(21) Appl. No.: 11/189,198

(22) Filed: Jul. 26, 2005

(65) Prior Publication Data

US 2006/0025559 A1 Feb. 2, 2006

(30) Foreign Application Priority Data

Jul. 29, 2004 (DE) .................. 10 2004 036 757

(51) Int. Cl.
*C08G 64/00* (2006.01)
(52) U.S. Cl. .............. 528/196; 264/176.1; 264/219; 359/109; 369/47; 528/198
(58) Field of Classification Search ........... 264/176.1, 264/219; 359/109; 369/47, 59.11; 528/196, 528/198
See application file for complete search history.

(56) References Cited

U.S. PATENT DOCUMENTS

| 3,795,715 | A | * | 3/1974 | Cherdron et al. | ............. 525/164 |
| 4,136,087 | A | | 1/1979 | Williams, III et al. | ....... 528/219 |
| 4,254,252 | A | | 3/1981 | Hay | ............... 528/205 |
| 4,374,974 | A | | 2/1983 | Hay | ............... 528/219 |
| 4,493,751 | A | * | 1/1985 | Cherdron et al. | ......... 162/157.2 |
| 4,978,725 | A | * | 12/1990 | Reske et al. | ................ 525/399 |
| 5,852,135 | A | * | 12/1998 | Kanai et al. | ................ 525/398 |
| 6,391,418 | B1 | | 5/2002 | Ueda et al. | ................ 428/64.7 |
| 6,753,363 | B1 | * | 6/2004 | Harashina | .................. 524/99 |

OTHER PUBLICATIONS

Polymer Engineering Plastic Corp., Oct. 2004, vol. 44, No. 10, pp. 1877-1884, Present at joint program of ISOM and ODS Jul. 2002, , Masaya Ueda, "A Study of the Characteristics of Antiplasticized Polycarbonates and Their Optical Disk Substrates".

* cited by examiner

*Primary Examiner*—Terressa M Boykin
(74) *Attorney, Agent, or Firm*—Aron Preis

(57) ABSTRACT

A thermoplastic molding composition comprising (co)poly (ester)carbonate, and a cyclic oligoformal is disclosed. The composition that is characterized in its lowered water absorption and improved flowability is suitable for a variety of application including in particular optical data storage media.

16 Claims, No Drawings

CYCLIC OLIGOFORMALS IN POLYCARBONATE

FIELD OF THE INVENTION

The invention relates to thermoplastic molding compositions and in particular to compositions containing polycarbonate.

BACKGROUND OF THE INVENTION

Because of their particular combination of properties such as transparency, heat-resistance and dimensional stability, polycarbonates are generally used as materials for the injection or injection-compression molding of optical data storage media. Additives, such as mold release agents and stabilizers are generally added to the polycarbonate in order to improve processability, processing generally proceeding at temperatures in the range from 300° C. to 400° C.

Aromatic polycarbonates based on bisphenol A are in particular used for the production of optical data storage media. They are, however, capable of absorbing up to 0.34 wt. % of water, which may have an unfavorable impact on the dimensional stability of the data storage media. Improved dimensional stability is, however, of significance, particularly when using blue or blue-green lasers.

U.S. Pat. No. 6,391,418 describes substrates for data storage media, which contain a biphenyl derivative as an additive to increase dimensional stability (lower shrinkage).

The addition of small quantities of m-terphenyl to bisphenol A polycarbonate is described in M. Ueda, Mitsubishi Engineering Plastics Corp., Technical Digest of Joint ISOM/ODS 2002 Waikoloa Hi., 8.7.2002, pages 33-35, this addition resulting in a reduction of water absorption. These biphenyl derivatives have the disadvantage, however, that they are highly conjugated aromatic π-systems, which exhibit absorption in the blue or blue-green range of the spectrum. This is undesirable in storage technologies which operate in this wavelength range. Terphenyls are moreover relatively rigid molecules, the rigidity having a negative effect on mechanical properties in a mixture with polycarbonate.

The options described in the prior art thus do not provide results which are satisfactory in every respect. There is, however, no indication to be found in the prior art that cyclic oligoformals could be suitable as additives.

The object accordingly arose of providing thermoplastic molding compositions containing polycarbonate with reduced water absorption which consequently exhibit better dimensional stability. New disk formats, which have a higher storage capacity and may also be thinner, such as for example digital versatile disks (DVDs), in particular require greater thermal stability in comparison with CDs. Any material damage occurring during conversion into moldings and the formation of deposits in the mold are becoming more critical. It is accordingly desirable for an additive for reducing water absorption simultaneously to bring about a reduction in melt viscosity and thus better flow at somewhat lower temperatures.

SUMMARY OF THE INVENTION

A thermoplastic molding composition comprising (co)poly(ester)carbonate, and a cyclic oligoformal is disclosed. The composition that is characterized in its lowered water absorption and improved flowability is suitable for a variety of application including in particular optical data storage media.

DETAILED DESCRIPTION OF THE INVENTION

This object is surprisingly achieved with the molding compositions according to the invention by improved quality of the data storage media and improved processability of the material by injection molding or injection-compression molding and reduced water absorption and thus ultimately improved dimensional stability.

The present invention accordingly provides thermoplastic molding compositions containing a polycarbonate and at least one cyclic oligoformal according to the invention with a specific chemical structure as an additive for reducing water absorption. These cyclic oligoformals give rise to improved dimensional stability of the data storage media and simultaneously bring about lower melt viscosity.

The oligoformals according to the invention have the general formula (1)

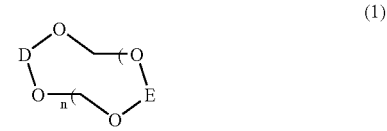

(1)

in which the residue O-D-O or O-E-O denotes randomly incorporated diphenolate residues, in which -D- and -E- are mutually independently an aromatic residue with 6 to 40 C atoms, which may contain one or more aromatic or fused aromatic nuclei optionally containing heteroatoms and is optionally substituted with $C_1$-$C_{12}$ alkyl residues or halogen and may contain aliphatic residues, cycloaliphatic residues, aromatic nuclei or heteroatoms as bridging members, n is a measure of ring size and denotes 2-25, preferably 2-20, in particular 3-10.

That means compounds of the general formula (I) are used for the preparation of the blends.

Compounds of the formula (2) are also preferred

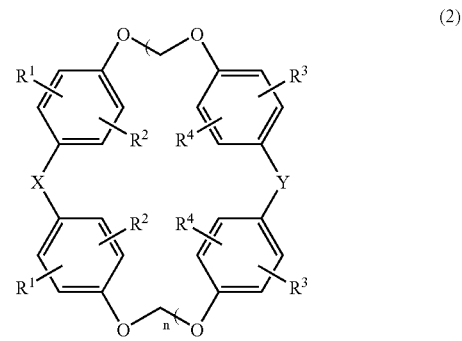

(2)

in which $R^1$ to $R^4$ mutually independently denote H, linear or branched $C_1$-$C_{18}$ alkyl or alkoxy residues, halogen such as Cl or Br or an optionally substituted aryl or aralkyl residue, preferably H or linear or branched $C_1$-$C_{12}$ alkyl, particularly preferably H or $C_1$-$C_8$ alkyl residues and very particularly preferably H or methyl, X and Y mutually independently denote a single bond, —$SO_2$—, —CO—, —O—, —S—, a $C_1$ to $C_6$ alkylene, $C_2$ to $C_5$ alkylidene, $C_5$ to $C_6$ cycloalkylidene residue, which may be substituted with $C_1$ to $C_6$ alkyl, preferably methyl or ethyl residues, or a $C_6$ to $C_{12}$ arylene residue, which may optionally be fused with further aromatic rings containing heteroatoms and n has the meaning stated above for the formula (1).

The diphenolate residues in the formulae (1) are preferably derived from the diphenols stated below:

hydroquinone, resorcinol, dihydroxybiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl)sulfones, bis(hydroxyphenyl)sulfoxides, α,α'-bis(hydroxyphenyl)diisopropylbenzenes, and the ring-alkylated and ring-halogenated compounds thereof, and also α,ω-bis(hydroxyphenyl)polysiloxanes. Particularly preferred diphenols are 4,4'-dihydroxybiphenyl (DOD), 2,2-bis(4-hydroxyphenyl)propane(bisphenol A), 1,1-bis(4-hydroxyphenyl)-3,3,5-trimethylcyclohexane(bisphenol TMC), 1,1-bis(4-hydroxyphenyl)cyclohexane, 2,4-bis(4-hydroxyphenyl)-2-methylbutane, 1,1-bis(4-hydroxyphenyl)-1-phenylethane, 1,1-1,4-bis[2-(4-hydroxyphenyl)-2-propyl]benzene, 1,3-bis[2-(4-hydroxyphenyl)-2-propyl]benzene(bisphenol M), 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl)sulfone, 2,4-bis(3,5-dimethyl-4-hydroxyphenyl)-2-methylbutane, 2,2-bis(3,5-dichloro-4-hydroxyphenyl)propane and 2,2-bis(3,5-dibromo-4-hydroxyphenyl)-propane.

Very particularly preferred diphenols are 2,2-bis(4-hydroxyphenyl)propane(bisphenol A), 4,4'-dihydroxybiphenyl (DOD), 1,3-bis[2-(4-hydroxyphenyl)-2-propyl]benzene (bisphenol M), 2,2-bis(3,5-dimethyl-4-hydroxyphenyl)propane, 1,1-bis(4-hydroxyphenyl)-1-phenylethane, 2,2-bis(3,5-dichloro-4-hydroxyphenyl)-propane, 2,2-bis(3,5-dibromo-4-hydroxyphenyl)propane, 1,1-bis(4-hydroxyphenyl)-cyclohexane and 1,1-bis(4-hydroxyphenyl)-3,3,5-trimethylcyclohexane(bisphenol TMC).

2,2-Bis(4-hydroxyphenyl)-propane(bisphenol A), 4,4'-dihydroxybiphenyl (DOD), 1,3-bis[2-(4-hydroxyphenyl)-2-propyl]benzene(bisphenol M) and 1,1-bis(4-hydroxyphenyl)-3,3,5-trimethylcyclohexane (bisphenol TMC) are in particular preferred.

Cyclic oligoformals are most particularly preferably described by the general formula (3).

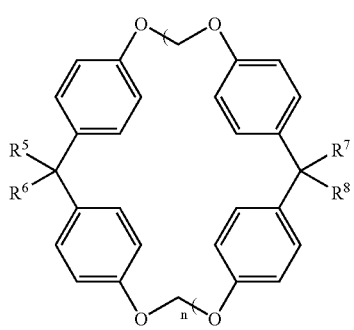

(3)

in which $R^5$ to $R^8$ mutually independently preferably denote H or linear or branched $C_1$-$C_{12}$ alkyl, particularly preferably H or $C_1$-$C_8$ alkyl residues and very particularly preferably H or methyl, wherein $R^5$ and $R^6$ or $R^7$ and $R^8$ may also be closed to form a $C_5$-$C_{10}$ cycloalkyl residue, which may be $C_1$-$C_6$ alkyl-substituted and n has the above-stated meaning.

The compounds of the formulae (4a) to (4c) are furthermore very particularly preferred

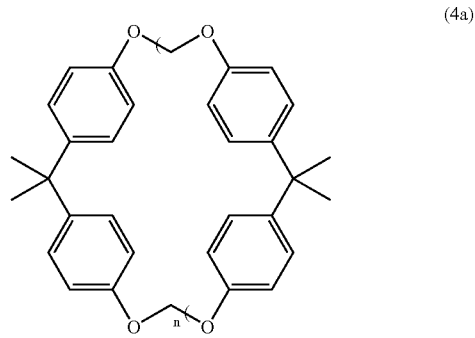

(4a)

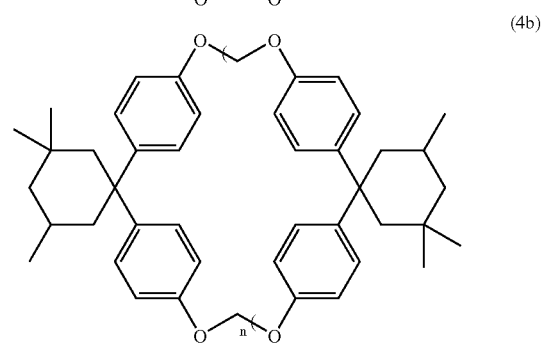

(4b)

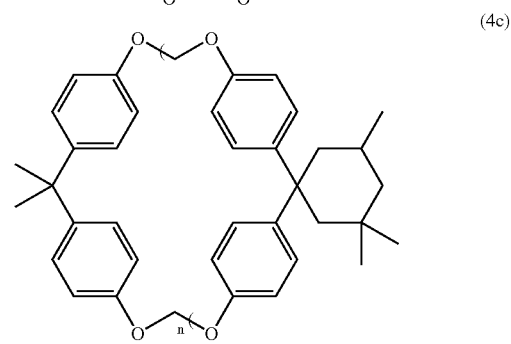

(4c)

in which n has the above-stated meaning.

The diphenols may be used both alone and as a mixture with one another. In the event that the cyclic oligoformals are synthesised from different diphenols, preferably from 2 different diphenols, (i.e. the residues D and E shown in formula (1) or the radicals X and Y in formula (2) have a different structure), the molar ratio in % of the diphenols is 95:5 to 5:95, preferably 95:5 to 10:90, particularly preferably 95:5 to 75:25 and in particular 90:10 to 60:40. The different diphenols are generally distributed randomly in the ring.

Unlike polycarbonate, cyclic oligoformals may be produced in a homogeneous phase from bisphenols and methylene chloride in the presence of alkali metal hydroxides. In this condensation reaction, methylene chloride acts simultaneously as reactant and solvent. U.S. Pat. No. 4,374,974, incorporated herein by reference, describes a process in which linear and cyclic oligo- and polyformals may be obtained starting from specific bisphenols after reaction with methylene chloride.

The polymer blends according to the invention generally contain the cyclic oligoformals in a proportion of 10-60,000 ppm, preferably 10-50,000 ppm, particularly preferably 20-40,000 ppm, very particularly preferably between 50 and 35,000 ppm, in particular 1000-30,000 ppm.

The definitions, parameters, compounds and explanations stated in the description or in preferential ranges may, however, also be combined with one another at will, i.e. between the particular ranges and preferential ranges.

The invention furthermore provides the use of such molding compositions for the production of optical data storage media, such as for example compact disks, video disks, digital versatile disks and further write-once or rewritable/erasable optical data storage media, and the optical data storage media themselves which may be produced from the polymer blends.

The polymer blend may, of course, also be used for other traditional polycarbonate applications, including in those which use a polycarbonate with a relatively high molecular weight. The applications may be transparent or opaque, such as for example: packaging for foodstuffs and beverages, optical lenses and prisms, lenses for illumination purposes, automotive headlight lenses, glazing for construction vehicles and motor vehicles, other kinds of glazing, such as for greenhouses, "twin wall sheets" or "cellular sheets". Other examples of applications are profiles, films, casing components of all kinds, for example for medical equipment, domestic appliances such as juice extractors, coffee machines, mixers; for office machines such as computers, monitors, printers, copiers; for sheets, tubes, electrical ducting, windows, doors and profiles for the construction sector, interior fittings and exterior applications; in electrical engineering, for example for switches and connectors. The moldings according to the invention may furthermore be used for interior fittings and components in rail vehicles, ships, aircraft, buses and other motor vehicles and for automotive bodywork parts.

Thermoplastic molding compositions for the purposes of the present invention contain predominantly aromatic polycarbonates. Polycarbonates should be taken to mean both homopolycarbonates and copolycarbonates, including polyestercarbonates, all of which resins are well known and available commercially; the polycarbonates may, in known manner, be linear or branched. They have a weight average molecular weight, determined by gel permeation chromatography, of 5,000 to 80,000, preferably 10,000 to 40,000. Molecular weight is particularly preferably between 15,000 and 35,000, in particular 15,000 and 22,000.

These polycarbonates are produced in known manner from aromatic dihydroxy compounds, carbonic acid derivatives, optionally chain terminators and optionally branching agents.

Details relating to the production of polycarbonates have been set down in numerous patent specifications over the last approx. 40 years. Reference will be made here, merely by way of example, to Schnell, "Chemistry and Physics of Polycarbonates", Polymer Reviews, Volume 9, Interscience Publishers, New York, London, Sydney 1964, D. Freitag, U. Grigo, P. R. Müller, N. Nouvertne', BAYER AG, "Polycarbonates" in Encyclopedia of Polymer Science and Engineering, Volume 11, Second Edition, 1988, pages 648-718 and finally Dr. U. Grigo, Dr. K. Kirchner and Dr. P. R. Müller "Polycarbonate" in Becker/Braun, Kunststoff-Handbuch, Vol. 3/1, "Polycarbonate, Polyacetale, Polyester, Celluloseester", Carl Hanser Verlag Munich, Vienna, 1992, pages 117-299.

Aromatic dihydroxy compounds suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfones, bis(hydroxyphenyl)sulfoxides, α,α'-bis(hydroxyphenyl)diisopropylbenzenes, and the ring-alkylated and ring-halogenated compounds thereof.

Preferred diphenols are 4,4'-dihydroxydiphenyl, 2,2-bis(4-hydroxyphenyl)propane, 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, 2,2-bis(3-chloro-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone, 2,4-bis(3,5-dimethyl-4-hydroxyphenyl)-2-methylbutane, 1,4-bis[2-(4-hydroxyphenyl)-2-propyl]benzene, 2,2-bis(3,5-dichloro-4-hydroxyphenyl)propane, 2,2-bis(3,5-dibromo-4-hydroxyphenyl)propane, 1,1-bis(4-hydroxyphenyl)-3,3,5-trimethylcyclohexane and 1,3-bis [2-(4-hydroxyphenyl)-2-propyl]benzene.

Particularly preferred diphenols are 2,2-bis(4-hydroxyphenyl)propane (BPA), 2,2-bis(3,5-dimethyl-4-hydroxyphenyl)propane, 2,2-bis(3,5-dichloro-4-hydroxyphenyl)propane, 2,2-bis(3,5-dibromo-4-hydroxyphenyl)propane, 1,3-bis[2-(4-hydroxyphenyl)-2-propyl]benzene (BPM), 1,1-bis(4-hydroxyphenyl)cyclohexane and 1,1-bis(4-hydroxyphenyl)-3,3,5-trimethylcyclohexane (TMC).

These and further suitable diphenols are described, for example, in U.S. Pat. Nos. 3,028,635, 2,999,835, 3,148,172, 2,991,273, 3,271,367, 4,982,014 and 2,999,846, in DE-A 1 570 703, 2 063 050, 2 036 052, 2 211 956 and 3 832 396, French patent 1 561 518, in the monograph by "H. Schnell, Chemistry and Physics of Polycarbonates, Interscience Publishers, New York 1964" and in JP-A 62039/1986, 62040/1986 and 105550/1986 all incorporated herein by reference.

In the case of homopolycarbonates only one diphenol is used, while in the case of copolycarbonates two or more diphenols are used.

Preferably used molding compositions are those which contain at least one polycarbonate with diol building blocks of BPA and/or trimethylcyclohexylbisphenol (TMC), preferably selected from among the group of homopolymers of BPA, the copolymers of BPA with TMC or the copolymers with 5 to 60 wt. % TMC.

Suitable carbonic acid derivatives are, for example, phosgene or diphenyl carbonate.

Suitable chain terminators are both monophenols and monocarboxylic acids. Suitable monophenols are phenol itself, alkylphenols such as cresols, p-tert.-butylphenol, p-n-octylphenol, p-iso-octylphenol, p-n-nonylphenol and p-iso-nonylphenol, p-cumylphenol, halophenols such as p-chlorophenol, 2,4-dichlorophenol, p-bromophenol, amylphenol and 2,4,6-tribromophenol and the mixtures thereof.

Preferred chain terminators are the phenols of the formula (I)

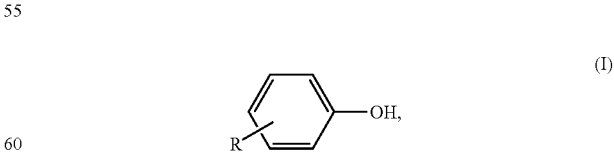

in which R is hydrogen, tert.-butyl or a branched or unbranched $C_8$ and/or $C_9$ alkyl residue. p-Cumylphenol may, however, also preferably be used. In the case of the transesterification process, the chain terminator arises from the diaryl carbonate used.

The quantity of chain terminator to be used, preferably in the phase boundary process, amounts to 0.1 mol % to 5 mol %, relative to moles of diphenols used in each case. The addition of chain terminators may take place before, during or after phosgenation. Suitable branching agents are the tri- or more than trifunctional compounds known in polycarbonate chemistry, in particular those with three or more than three phenolic OH groups.

Suitable branching agents are for example phloroglucinol, 4,6-dimethyl-2,4,6-tri-(4-hydroxyphenyl)-2-heptene, 4,6-dimethyl-2,4,6-tri-(4-hydroxyphenyl)heptane, 1,3,5-tri-(4-hydroxyphenyl)benzene, 1,1,1-tri-(4-hydroxyphenyl)ethane, tri-(4-hydroxyphenyl)phenylmethane, 2,2-bis[4,4-bis(4-hydroxyphenyl)cyclohexyl]propane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, hexa-(4-(4-hydroxyphenylisopropyl)-phenyl)-orthoterephthalic acid ester, tetra-(4-hydroxyphenyl)methane, tetra-(4-(4-hydroxyphenylisopropyl)phenoxy)methane and 1,4-bis(4',4"-dihydroxytriphenyl)methyl)benzene and 2,4-dihydroxybenzoic acid, trimesic acid, cyanuric chloride and, for some applications, even preferably 3,3-bis(3-methyl-4-hydroxyphenyl)-2-oxo-2,3-dihydroindole.

The quantity of branching agents optionally to be used amounts to 0.01 mol % to 2 mol %, again relative to moles of diphenols used in each case.

In the phase boundary process, the branching agents may either be initially introduced with the diphenols and the chain terminators in the aqueous, alkaline phase or be added in solution in an organic solvent. In the case of the transesterification process, the branching agents may be introduced together with the diphenols.

All these measures for the production of thermoplastic polycarbonates are familiar to the person skilled in the art.

The thermoplastic polymer blends according to the invention may furthermore contain additives conventional for polycarbonates in known quantities, such as for example and preferably UV stabilizers, flame retardants, colorants, fillers, foaming agents, optical brighteners and antistatic agents. In optical applications, the components which are preferably included are those which do not have a negative impact on the transparency of the material.

These substances may be found in many publications, such as for instance in Additives for Plastics Handbook, John Murphy, 1999 and are commercially available.

1. Suitable antioxidants are for example:

1.1. Alkylated monophenols for example 2,6-di-tert.-butyl-4-methylphenol, 2-tert.-butyl-4,6-dimethylphenol, 2,6-di-tert.-butyl-4-ethylphenol, 2,6-di-tert.-butyl-4-n-butylphenol, 2,6-di-tert.-butyl-4-isobutylphenol, 2,6-dicyclopentyl-4-methylphenol, 2-($\alpha$-methylcyclohexyl)-4,6-dimethylphenol, 2,6-dioctadecyl-4-methylphenol, 2,4,6-tricyclohexylphenol, 2,6-di-tert.-butyl-4-methoxymethylphenol, nonylphenols which are linear or branched in the side chain, for example, 2,6-dinonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol.

1.2. Alkylthiomethylphenols, for example 2,4-dioctylthiomethyl-6-tert.-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert.-butyl-4-methyoxyphenol, 2,5-di-tert.-butylhydroquinone, 2,5-di-tert.-amylhydroquinone, 2,6-diphenyl-4-octadecyloxyphenol, 2,6-di-tert.-butylhydroquinone, 2,5-di-tert.-butyl-4-hydroxyanisole, 2,6-di-tert.-butyl-4-hydroxyanisole, 3,5-di-tert.-butyl-4-hydroxyphenyl stearate, bis(3,5-di-tert.-butyl-4-hydroxyphenyl)adipate.

1.4. Tocopherols, for example $\alpha$-tocopherol, $\beta$-tocopherol, $\gamma$-tocopherol, $\delta$-tocopherol and mixtures thereof (vitamin E).

1.5. Hydroxylated thiodiphenyl ethers, for example 2,2'-thiobis(6-tert.-butyl-4-methylphenol), 2,2'-thiobis(4-octylphenol), 4,4'-thiobis(6-tert.-butyl-3-methylphenol), 4,4'-thiobis(6-tert.-butyl-2-methylphenol), 4,4'-thiobis(3,6-di-sec.-amylphenol), 4,4'-bis(2,6-dimethyl-4-hydroxyphenyl) disulfide.

1.6. Alkylidenebisphenols, for example 2,2'-methylenebis (6-tert.-butyl-4-methylphenol), 2,2'-methylenebis(6-tert.-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert.-butylphenol), 2,2'-ethylidenebis(4,6-di-tert.-butylphenol), 2,2'-ethylidenebis(6-tert.-butyl-4-isobutylphenol), 2,2'-methylenebis[6-$\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert.-butylphenol), 4,4'-methylenebis(6-tert.-butyl-2-methylphenol), 1,1-bis(5-tert.-butyl-4-hydroxy-2-methylphenyl)butane, 2,6-bis(3-tert.-butyl-5-methyl-2-hydroxybenzyl)-4-methylphenol, 1,1,3-tris(5-tert.-butyl-4-hydroxy-2-methylphenyl)butane, 1,1-bis(5-tert.-butyl-4-hydroxy-2-methylphenyl)-3-n-dodecylmercaptobutane, ethylene glycol bis[3,3-bis(3'-tert.-butyl-4'-hydroxyphenyl)butyrate], bis(3-tert.-butyl-4-hydroxy-5-methylphenyl)dicyclopentadiene, bis[2-(3'-tert.-butyl-2'-hydroxy-5'-methylbenzyl)-6-tert.-butyl-4-methylphenyl]terephthalate, 1,1-bis(3,5-dimethyl-2-hydroxyphenyl)butane, 2,2-bis(3,5-di-tert.-butyl-4-hydroxyphenyl)propane, 2,2-bis(5-tert.-butyl-4-hydroxy-2-methylphenyl)-4-n-dodecylmercaptobutane, 1,1,5,5-tetra-(5-tert.-butyl-4-hydroxy-2-methylphenyl)pentane.

1.7. O-, N- and S-benzyl compounds, for example 3,5,3', 5'-tetra-tert.-butyl-4,4'-dihydroxydibenzyl ether, octadecyl-4-hydroxy-3,5-dimethylbenzyl mercaptoacetate, tridecyl-4-hydroxy-3,5-di-tert.-butylbenzyl mercaptoacetate, tris-(3,5-di-tert.-butyl-4-hydroxybenzyl)amine, bis(4-tert.-butyl-3-hydroxy-2,6-dimethylbenzyl)dithioterephthalate; bis(3,5-di-tert.-butyl-4-hydroxybenzyl) sulfide, isooctyl-3,5-di-tert.-butyl-4-hydroxybenzyl mercaptoacetate.

1.8. Hydroxybenzylated malonates, for example dioctadecyl-2,2-bis(3,5-di-tert.-butyl-2-hydroxybenzyl) malonate, dioctadecyl-2-(3-tert.-butyl-4-hydroxy-5-methyl-benzyl) malonate, didodecylmercaptoethyl-2,2-bis(3,5-di-tert.-butyl-4-hydroxybenzyl) malonate, bis[4-(1,1,3,3-tetramethylbutyl)phenyl]-2,2-bis(3,5-di-tert.-butyl-4-hydroxybenzyl) malonate.

1.9. Aromatic hydroxybenzyl compounds, for example 1,3,5-tris(3,5-di-tert.-butyl-4-hydroxybenzyl)-2,4,6-trimethylbenzene, 1,4-bis(3,5-di-tert.-butyl-4-hydroxybenzyl)-2,3, 5,6-tetramethylbenzene, 2,4,6-tris(3,5-di-tert.-butyl-4-hydroxybenzyl)phenol.

1.10. Triazine compounds, for example 2,4-bis(octylmercapto)-6-(3,5-di-tert.-butyl-4-hydroxyanilino)-1,3,5-triazine, 2-octylmercapto-4,6-bis(3,5-di-tert.-butyl-4-hydroxyanilino)-1,3,5-triazine, 2-octylmercapto-4,6-bis(3,5-di-tert.-butyl-4-hydroxyphenoxy)-1,3,5-triazine, 2,4,6-tris(3,5-di-tert.-butyl-4-hydroxyphenoxy)-1,2,3-triazine, 1,3,5-tris-(3, 5-di-tert.-butyl-4-hydroxybenzyl) isocyanurate, 1,3,5-tris(4, tert.-butyl-3-hydroxy-2,6-dimethylbenzyl)isocyanurate, 2,4, 6-tris(3,5-di-tert.-butyl-4-hydroxyphenoxy)-1,3,5-triazine, 1,3,5-tris(3,5-di-tert.-butyl-4-hydroxyphenylpropionyl) hexahydro-1,3,5-triazine, 1,3,5-tris(3,5-dicyclohexyl-4-hydroxybenzyl)isocyanurate.

1.11. Acylaminophenols for example 4-hydroxylauranilide, 4-hydroxystearanilide, octyl-N-(3,5-di-tert.-butyl-4-hydroxyphenyl)carbamate.

1.12. Ester of β-(3,5-di-tert.-butyl-4-hydroxyphenyl)propionic acid with mono- or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane, the ester with octadecanol (IRGANOX 1076® from Ciba Spec.) being here very particularly suitable and preferred.

1.13. Esters of β-(5-tert.-butyl-4-hydroxy-3-methylphenyl)propionic acid with mono- or polyhydric alcohols, for example with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(3,5-dicyclohexyl-4-hydroxyphenyl)propionic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of 3,5-di-tert.-butyl-4-hydroxyphenylacetic acid with mono- or polyhydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Amides of β-(3,5-di-tert.-butyl-4-hydroxyphenyl)propionic acid, for example N,N'-bis(3,5-di-tert.-butyl-4-hydroxyphenylpropionyl)hexamethylenediamide, N,N'-bis(3,5-di-tert.-butyl-4-hydroxyphenylpropionyl)trimethylenediamide, N,N'-bis(3,5-di-tert.-butyl-4-hydroxyphenylpropionyl)hydrazine, N,N'-bis[2-(3-[3,5-di-tert.-butyl-4-hydroxyphenyl]-propionyloxy)ethyl]oxamide (Naugard® XL-1 from Uniroyal).

1.17. Ascorbic acid (vitamin C)

1.18. Amine-type antioxidants, for example N,N'-diisopropyl-p-phenylenediamine, N,N'-di-sec.-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec.-butyl-p-phenylenediamine, diphenylamine, N-allyldiphenylamine, 4-isopropoxydiphenylamine, N-phenyl-1-naphthylamine, N-(4-tert.-octylphenyl)-1-naphthylamine, N-phenyl-2-naphthylamine, octylated diphenylamine, for example p,p'-di-tert.-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert.-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis [(2-methylphenyl)amino]ethane, 1,2-bis(phenylamino)propane, o-tolyl biguanide, bis[4-(1',3'-dimethylbutyl)phenyl]amine, tert.-octylated N-phenyl-1-naphthylamine, a mixture of mono- and dialkylated tert.-butyl/tert.-octyldiphenylamines, a mixture of mono- and dialkylated nonyldiphenylamines, a mixture of mono- and dialkylated dodecyldiphenylamines, a mixture of mono- and dialkylated isopropyl/isohexyldiphenylamines, a mixture of mono- and dialkylated tert.-butylphenylamines, 2,3-dihydro-3,3-dimethyl-4H-1,4-benzothiazine, phenothiazine, a mixture of mono- and dialkylated tert.-butyl/tert.-octylphenothiazines, a mixture of mono- and dialkylated tert.-octylphenothiazines, N-allylphenothiazine, N,N,N',N'-tetraphenyl-1,4-diaminobut-2-ene, N,N-bis(2,2,6,6-tetramethylpiperid-4-yl)hexamethylenediamine, bis(2,2,6,6-tetramethylpiperid-4-yl) sebacate, 2,2,6,6-tetramethylpiperidin-4-one, 2,2,6,6-tetramethylpiperidin-4-ol. These compounds may be used individually or as mixtures thereof 1.19 Suitable thiosynergists are for example dilauryl thiodipropionate and/or distearyl thiodipropionate.

2. UV absorbers and light stabilizers may be used in the process according to the invention in an amount from 0.1 to 15 wt. %, preferably 3 to 8 wt. %, relative to the mass of the composition. Suitable UV absorbers and light stabilizers are, for example:

2.1. 2-(2'-Hydroxyphenyl)benzotriazoles, for example 2-(2'-hydroxy-5'-methylphenyl)benzotriazole, 2-(3',5'-di-tert.-butyl-2'-hydroxyphenyl)benzotriazole, 2-(5'-tert.-butyl-2'-hydroxyphenylbenzotriazole, 2-(2'-hydroxy-5'-(1,1,3,3-tetramethylbutyl)phenyl)benzotriazole, 2-(3',5'-di-tert.-butyl-2'-hydroxyphenyl)-5-chlorobenzotriazole, 2-(3'-tert.-butyl-2'-hydroxy-5'-methylphenyl)-5-chlorobenzotriazole, 2-(3'-sec.-butyl-5'-tert.-butyl-2'-hydroxyphenyl)benzotriazole, 2-(2'-hydroxy-4'-octyloxyphenyl)benzotriazole, 2-(3',5'-di-tert.-amyl-2'-hydroxyphenyl)benzotriazole, 2-(3',5'-bis (α, α-dimethylbenzyl)-2'-hydroxyphenyl)benzotriazole, 2-(3'-tert.-butyl-2'-hydroxy-5'-(2-octyloxycarbonylethyl)phenyl)-5-chlorobenzotriazole, 2-(3'-tert.-butyl-5'-[2-(2-ethylhexyloxy)carbonylethyl]-2'-hydroxyphenyl)-5-chlorobenzotriazole, 2-(3'-tert.-butyl-2'-hydroxy-5'-(2-methoxycarbonylethyl)phenyl)-5-chlorobenzotriazole, 2-(3'-tert.-butyl-2'-hydroxy-5'-(2-methyloxycarbonylethyl)phenyl)benzotriazole, 2-(3'-tert.-butyl-2'-hydroxy-5'-(2-octyloxycarbonylethyl)phenyl)benzotriazole, 2-(3'-tert.-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert.-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert.-butyl-5'-(2-methoxycarbonylethyl)-2'-hydroxyphenyl]-2H-benzotriazole with polyethylene glycol 300; [R—CH$_2$CH$_2$—COO—C$_2$CH$_2$]$_2$, wherein R=3'-tert.-butyl-4'-hydroxy-5'-2H-benzotriazol-2-ylphenyl, 2-[2'-hydroxy-3'-(α,α-dimethylbenzyl)-5'-(1,1,3,3-tetramethylbutyl)phenyl]benzotriazole, 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, such as for example 4-tert.-butylphenyl salicylate, phenyl salicylate, octylphenyl salicylate, dibenzoylresorcinol, bis(4-tert.-butylbenzoyl)resorcinol, benzoylresorcinol, 2,4-di-tert.-butylphenyl 3,5-di-tert.-butyl-4-hydroxybenzoate, hexadecyl 3,5-di-tert.-butyl-4-hydroxybenzoate, octadecyl 3,5-di-tert.-butyl-4-hydroxybenzoate, 2-methyl 4,6-di-tert.-butylphenyl-3,5-di-tert.-butyl-4-hydroxybenzoate.

2.4. Acrylates for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds for example nickel complexes of 2,2'-thiobis[4-(1,1,3,3-tetramethylbutyl)phenol], such as the 1:1 or 1:2 complex, with or without additional ligands, such as n-butylamine, triethanolamine or N-cyclohexyldiethanolamine, nickel dibutyl dithiocarbamate, nickel salts of the monoalkyl esters, for example of the methyl or ethyl ester, of 4-hydroxy-3,5-di-tert.-butylbenzylphosphonic acid, nickel complexes of ketoximes, for example of 2-hydroxy-4-methyl-phenylundecyl ketoxime, nickel complexes of 1-phenyl-4-lauroyl-5-hydroxypyrazole, with or without additional ligands.

2.6. Sterically hindered amines for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl), n-butyl-3, 5-di-tert.-butyl 4-hydroxybenzyl malonate, the condensation product of 1-(2-hydroxyethyl)-2,2,6,6-tetramethyl-4-hydroxypiperidine and succinic acid, linear or cyclic condensation products of N,N'-bis(2,2,6,6-tetramethyl-4-piperidyl) hexamethylenediamine and 4-tert.-octylamino-2,6-dichloro-1,3,5-triazine, tris(2,2,6,6-tetramethyl-4-piperidyl) nitrilotriacetate, tetrakis(2,2,6,6-tetramethyl-4-piperidyl) 1,2,3,4-butanetetracarboxylate, 1,1'-(1,2-ethanediyl)bis(3,3, 5,5-tetramethylpiperazinone), 4-benzoyl-2,2,6,6-tetramethylpiperidine, 4-stearyloxy-2,2,6,6-tetramethylpiperidine, bis (1,2,2,6,6-pentamethylpiperidyl)-2-n-butyl-2-(2-hydroxy-3, 5-di-tert.-butylbenzyl)malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl)succinate, linear or cyclic condensation products of N,N'-bis(2,2,6,6-tetramethyl-4-piperidyl)hexamethylenediamine and 4-morpholino-2,6-dichloro-1,3,5-triazine, the condensation product of 2-chloro-4,6-bis(4-n-butylamino-2,2,6,6-tetramethylpiperidyl)-1,3,5-triazine and 1,2-bis(3-aminopropylamino) ethane, the condensation product of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7, 7,9,9-tetramethyl-1,3,8-triazaspiro[4.5]decan-2,4-dione, 3-dodecyl-1-(2,2,6,6-tetramethyl-4-piperidyl)pyrrolidin-2, 5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis(2,2,6,6-tetramethyl-4-piperidyl)hexamethylendiamine and 4-cyclohexylamino-2,6-dichloro-1,3,5-triazine, a condensation product of 1,2-bis(3-aminopropylamino)ethane and 2,4,6-trichloro-1,3,5-triazine and 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4.5]decane, a reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl) ethene, N,N'-bis(formyl)-N,N'-bis(2,2,6,6-tetramethyl-4-piperidyl)hexamethylenediamine, diesters of 4-methoxymethylenemalonic acid with 1,2,2,6,6-pentamethyl-4-hydroxypiperidine, poly[methylpropyl-3-oxy-4-(2, 2,6,6-tetramethyl-4-piperidyl)]siloxane, reaction product of maleic anhydride/α-olefin copolymer with 2,2,6,6-tetramethyl-4-aminopiperidine or 1,2,2,6,6-pentamethyl-4-aminopiperidine.

2.7. Oxamides, for example 4,4'-dioctyloxyoxanilide, 2,2'-diethoxyoxanilide, 2,2'-dioctyloxy-5,5'-di-tert.-butoxanilide, 2,2'-didodecyloxy-5,5'-di-tert.-butoxanilide, 2-ethoxy-2'-ethyloxanilide, N,N'-bis(3-dimethylaminopropyl) oxamide, 2-ethoxy-5-tert.-butyl-2'-ethoxanilide and the mixture thereof with 2-ethoxy-2'-ethyl-5,4'-di-tert.-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1, 3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)-phenyl]-4, 6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[-2-hydroxy-4-(2-hydroxy-3-dodecyloxypropoxy)-phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

These compounds may be used individually or as mixtures thereof.

3. Suitable metal deactivators are for example N,N'-diphenyloxamide, N-salicylal-N'-salicyloylhydrazine, N,N'-bis (salicyloyl)hydrazine, N,N'-bis(3,5-di-tert.-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoylbisphenyl hydrazide, N,N'-diacetyladipoyl dihydrazide, N,N'-bis(salicyloyl)oxalyl dihydrazide, N,N'-bis(salicyloyl)thiopropionyl dihydrazide. These compounds may be used individually or as mixtures thereof.

4. Suitable peroxide scavengers are for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(dodecylmercapto)propionate. These compounds may be used individually or as mixtures thereof.

5. Suitable basic costabilizers are, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate. These compounds may be used individually or as mixtures thereof.

6. Suitable nucleating agents are for example inorganic substances, such as talcum, metal oxides, such as titanium dioxide or magnesium oxide, phosphates, carbonates or sulfates, preferably of alkaline earth metals; organic compounds, such as mono- or polycarboxylic acids and the salts thereof, for example 4-tert.-butylbenzoic acid, adipic acid, diphenylacetic acid, sodium succinate or sodium benzoate; polymeric compounds, such as ionic copolymers (ionomers). Particularly preferred compounds are 1,3:2,4-bis(3',4'-dimethylbenzylidene)sorbitol, 1,3:2,4-di(paramethyldibenzylidene)sorbitol and 1,3:2,4-di(benzylidene)sorbitol. These compounds may be used individually or as mixtures thereof.

7. Suitable fillers and reinforcing materials are for example calcium carbonate, silicates, glass fibres, glass bubbles, asbestos, talcum, kaolin, mica, barium sulfate, metal oxides and hydroxides, carbon black, graphite, wollastonite, wood flour and flours or fibres of other natural products, synthetic fibres. These compounds may be used individually or as mixtures thereof.

8. Suitable other additives are for example plasticisers, slip agents, emulsifiers, pigments, viscosity modifiers, catalysts, levelling agents, optical brighteners, flame retardants, antistatic agents and blowing agents.

9. Suitable benzofuranones and indolinones are, for example, those which are disclosed in U.S. Pat. Nos. 4,325,863; 4,338,244; 5,175,312; 5,216,052; 5,252,643; DE-A-4316611; DE-A-4316622; DE-A-4316876; EP-A-0589839 or EP-A-0591102, or 3-[4-(2-acetoxyethoxy)phenyl]-5,7-di-tert.-butylbenzofuran-2-one, 5,7-di-tert.-butyl-3-[4-(2-stearoyloxyethoxy)phenyl]benzofuran-2-one, 3,3'-bis[5,7-di-tert.-butyl-3-(4-[2-hydroxyethoxy]phenyl)benzofuran-2-one], 5,7-di-tert.-butyl-3-(4-ethoxyphenyl)benzofuran-2-one, 3-(4-acetoxy-3,5-dimethylphenyl)-5,7-di-tert.-butylbenzofuran-2-one, 3-(3,5-dimethyl-4-pivaloyloxyphenyl)-5,7-di-tert.-butylbenzofuran-2-one, 3-(3,4-dimethylphenyl)-5,7-di-tert.-butylbenzofuran-2-one, 3-(2,3-dimethylphenyl)-5,7-di-tert.-butylbenzofuran-2-one, lactone antioxidants such as (8)

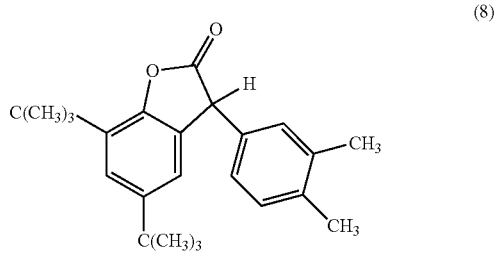

These compounds act for example as antioxidants. These compounds may be used individually or as mixtures thereof.

10. Suitable fluorescent plasticisers are those which are listed in "Plastics Handbook", eds. R. Gächter and H. Müller, Hanser Verlag, 3rd ed., 1990, pages 775-789.

11. Suitable flame retardant additives are phosphate esters, i.e. triphenyl phosphate, resorcinol diphosphoric acid esters, bromine-containing compounds, such as brominated phosphoric acid esters, brominated oligocarbonates and polycarbonates, together with salts, such as $C_4F_9SO_3^-Na^+$.

12. Suitable impact modifiers are butadiene rubber grafted with styrene-acrylonitrile or methyl methacrylate, ethylene/propylene rubbers grafted with maleic anhydride, ethyl and butyl acrylate rubbers grafted with methyl methacrylate or styrene/acrylonitrile, interpenetrating siloxane and acrylate networks grafted with methyl methacrylate or styrene/acrylonitrile.

13. Suitable polymers are SAN, ABS, PMMA, PTFE, PSU, PPS, polyolefins, such as polyethylene, polypropylene and ethylene/propylene rubbers, epoxy resins, polyesters, such as PBT, PET, PCT, PCTG and PETG and other polycarbonates produced by the phase boundary process.

14. Suitable antistatic agents are sulfonate salts, for example tetraethylammonium salts of $C_{12}H_{25}SO^{3-}$ or $C_8F_{17}SO^{3-}$.

15. Suitable colorants are pigments together with organic and inorganic dyes.

16. Compounds containing epoxy groups, such as 3,4-epoxycyclohexylmethyl 3,4-epoxycyclohexylcarboxylate, copolymers of glycidyl methacrylate and epoxysilanes.

17. Compounds containing anhydride groups, such as maleic anhydride, succinic anhydride, benzoic anhydride and phthalic anhydride.

18. Phosphites and phosphonites suitable as stabilizers are for example, triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert.-butylphenyl)phosphite, diisodecylpentaerythritol diphosphite, bis(2,4-di-tert.-butylphenyl)pentaerythritol diphosphite, bis(2,6-di-tert.-butyl-4-methylphenyl)pentaerythritol diphosphite, diisodecyloxypentaerythritol diphosphite, bis(2,4-di-tert.-butyl-6-methylphenyl)pentaerythritol diphosphite, bis(2,4,6-tris(tert.-butylphenyl)pentaerythritol diphosphite, tristearylsorbitol triphosphite, tetrakis(2,4-di-tert.-butylphenyl)-4,4'-biphenylene diphosphonite, 6-isooctyloxy-2,4,8,10-tetra-tert.-butyl-12H-dibenzo[d,g]-1,3,2-dioxaphosphocine, 6-fluoro-2,4,8,10-tetra-tert.-butyl-12-methyldibenzo[d,g]-1,3,2-dioxaphosphocine, bis(2,4-di-tert.-butyl-6-methylphenyl) methylphosphite, bis(2,4-di-tert.-butyl-6-methylphenyl) ethylphosphite, 6-fluoro-2,4,8,10-tetra-tert.-butyl-12-methyldibenzo[d,g]-1,3,2-dioxaphosphocine, 2,2',2''-nitrilotriethyltris(3,3',5,5'-tetra-tert.-butyl-1,1'-biphenyl-2,2'-diyl) phosphite], 2-ethylhexyl-(3,3',5,5'-tetra-tert.-butyl-1,1'-biphenyl-2,2'-diyl) phosphite, 5-butyl-5-ethyl-2-(2,4,6-tri-tert.-butylphenoxy)-1,3,2-dioxaphosphirane. These compounds may be used individually or as mixtures thereof.

Tris(2,4-di-tert.-butylphenyl)phosphite (Irgafos® 168, Ciba-Geigy), or triphenylphosphine are particularly preferred.

The compounds of groups 16 and 17 acts as melt stabilizers. They may be used individually or as mixtures.

Preferably used mold release agents are esters of mono- or polyhydric alcohols with long-chain carboxylic acids, such as Loxiol G32 or Loxiol G33. Mold release agents which have not been completely esterified and accordingly comprise free OH groups are also preferred. (Partial) esters of saturated monobasic fatty acids having 16 to 22 carbon atoms with glycerol, trimethylolpropane, pentaerythritol or similar polyhydric alcohols are particularly preferred, in particular glycerol monostearate (GMS) and glycerol monopalmitate. Pentaerythritol tetrastearate (PETS) is furthermore preferred.

Such saturated monobasic fatty acid esters of glycerol are used alone or as mixtures with two or more components. The saturated monoesters of glycerol are conventionally produced by transesterifying hydrogenated animal or vegetable oils with glycerol. Although the reaction product may also contain esters other than the glycerol esters, it is used as a mold release agent. The mixture may, for example, contain small or relatively large proportions of diglycerides and triglycerides.

The optimum quantity of mold release agent for the production of CDs and other optical data storage media (DVDs etc.) is determined, on the one hand, by a sufficient mold release action and, on the other hand, by the formation of deposits on the mold. Conventionally used concentrations of mold release agent are between 50 and 1,000 ppm, advantageously between 100 and 500 ppm. For other polycarbonate applications, the concentrations are 100-10,000 ppm, preferably 2,000-7,000 ppm.

Heat stabilizers which are used are, for example, specific phosphites which have both aromatic and aliphatic residues in a single molecule. These are compounds of the following structure:

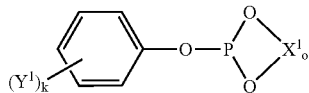

in which
k represents the number 0-5, preferably 1-3, very particularly preferably 3,
$Y^1$ in each case mutually independently means alkyl or optionally substituted aryl, preferably $C_1$-$C_4$ alkyl, particularly preferably methyl, sec.-butyl and tert.-butyl,
o represents the number 1-3, preferably 3 and
$X^1$ in each case mutually independently denotes an optionally substituted methylene residue, wherein at least one methylene residue must be completely substituted and the substituents are mutually independently selected from the group $C_1$-$C_{20}$ alkyl or alternatively the two substituents on a completely substituted methylene residue together denote a residue

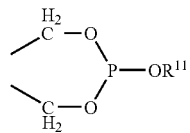

in which $R^{11}$ is selected from the group $C_1$-$C_{18}$ alkyl, $C_3$-$C_{12}$ cycloalkyl, $C_6$-$C_{30}$ alkaryl and aryl, wherein these residues may in turn be substituted by 1-4 O-alkylene-O and/or carboxylic acid ester-COO residues; $C_2$-$C_{18}$ polyhydroxyalkyl with 2 to 10 hydroxyl groups; $C_2$-$C_{18}$ polyphenyl residues with 2 to 10 phenolic OH groups.

Preferred compounds conform to the formula

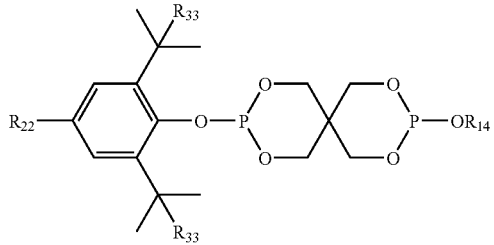

in which $R^{22}$ denotes $C_1$-$C_6$ alkyl;
$R^{33}$ denotes methyl or ethyl and
$R^{14}$ is selected from the group $C_1$-$C_{18}$ alkyl, $C_3$-$C_{12}$ cycloalkyl, $C_6$-$C_{20}$ alkaryl and aryl, wherein these residues may in turn be substituted by 1-4 O-alkylene-O and/or carboxylic acid ester-COO residues; $C_2$-$C_{18}$ polyhydroxyalkyl with 2 to 10 hydroxyl groups; $C_2$-$C_{18}$ polyphenyl residues with 2 to 10 phenolic OH groups.

Likewise preferred compounds are those of the formula

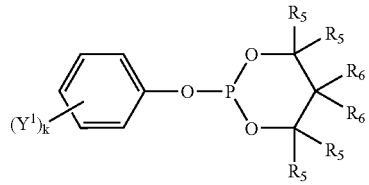

in which $Y^1$ and k have the above-stated meanings and
$R^5$ is mutually independently selected from the group hydrogen and $C_3$-$C_{20}$ alkyl, at least one $R^5$ here preferably denoting alkyl,
$R^6$ mutually independently denote $C_1$-$C_{10}$ alkyl.
Particularly preferred compounds are those of the formula

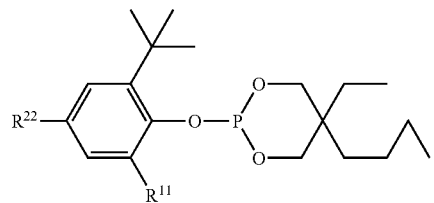

wherein $R^{11}$ and $R^{22}$ denote methyl, sec.-butyl or tert.-butyl.
The compounds defined in EP A1 0 038 876 on pages 16-20 and the example stated on page 21 of the same document are moreover likewise particularly preferred.

(2,4,6-Tri-tert.-butylphenyl)-(2-butyl-2-ethyl-propane-1, 3-diyl)phosphite, which as the following structure, is very particularly preferred:

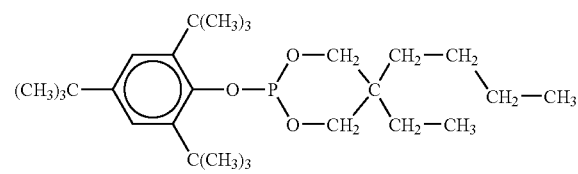

The phosphites may be used alone, but also in combination with other phosphorus compounds, wherein the other phosphorus compounds may also be those comprising phosphorus with a different oxidation number. It is accordingly possible, for example, to use combinations of the phosphites according to the invention with other phosphites, with phosphines, for example triphenylphosphine, with phosphonites, with phosphates, with phosphonates etc.

The phosphites used are generally known or may be produced in a similar manner to known phosphites, (2,4,6-tri-tert.-butylphenyl)-(2-butyl-2-ethyl-propane-1,3-diyl)phosphite is, for example, described in EP-A 702018 and EP 635514.

The polymer blends according to the invention contain the phosphorus compound in general in a proportion of 10-5,000 ppm, preferably of 10-1,000 ppm, particularly preferably of 20-500 ppm, very particularly preferably of between 50 and 250 ppm.

The mold release agent, the phosphorus compound and the formals according to the invention are for example and preferably added to the thermoplastic molding compositions by being apportioned after production and during working up of the polycarbonates, for example by addition to the polycarbonate polymer solution, or to a melt of the thermoplastic molding compositions. It is furthermore also possible to apportion the components mutually independently at different process steps, for example one of the components during working up of the polymer solution and the other component(s) to the melt, providing that it is ensured that all the components are present during production of the finished products (moldings).

For applications relating to CDs, DVDs and other optical recording media, the person skilled in the art will, of course, select those suitable additives which do not impair transparency from among the above-stated additives.

Very particularly suitable additives are IRGANOX 1076®, see above, and benzotriazoles from group 2.1 ("Tinuvins"), in particular mixed with one another and triphenylphosphine (TPP). The molding compositions according to the invention are used in the manner known for polycarbonates for the production of moldings, preferably optical media, in particular for the production of compact discs and DVDs and write-once or rewritable/erasable optical media. The writable layers here in particular contain dyes or metallic layers, wherein the latter utilize the change from the amorphous to the crystalline state as the recording principle or have magnetic properties.

The optical media are preferably produced from the finished molding compositions according to the invention, which for example assume the form of a granular product. The optical media may, however, also be produced by incorporating the components into pure or conventional commercial polycarbonates and/or into additives conventional in the production of moldings from polycarbonates.

The present invention accordingly also provides moldings, such as in particular optical data storage media, preferably compact discs and DVDs, which are obtainable from the thermoplastic molding compositions according to the invention.

The thermoplastic molding compositions according to the invention have the advantage that they exhibit lower water absorption and thus improved dimensional stability. They are also characterised by improved flow behaviour as they have a lower melt viscosity.

The following Examples serve to illustrate the invention. The invention is not restricted to the Examples.

EXAMPLES

Example 1

Synthesis of the Cyclic Homooligoformal from Bisphenol

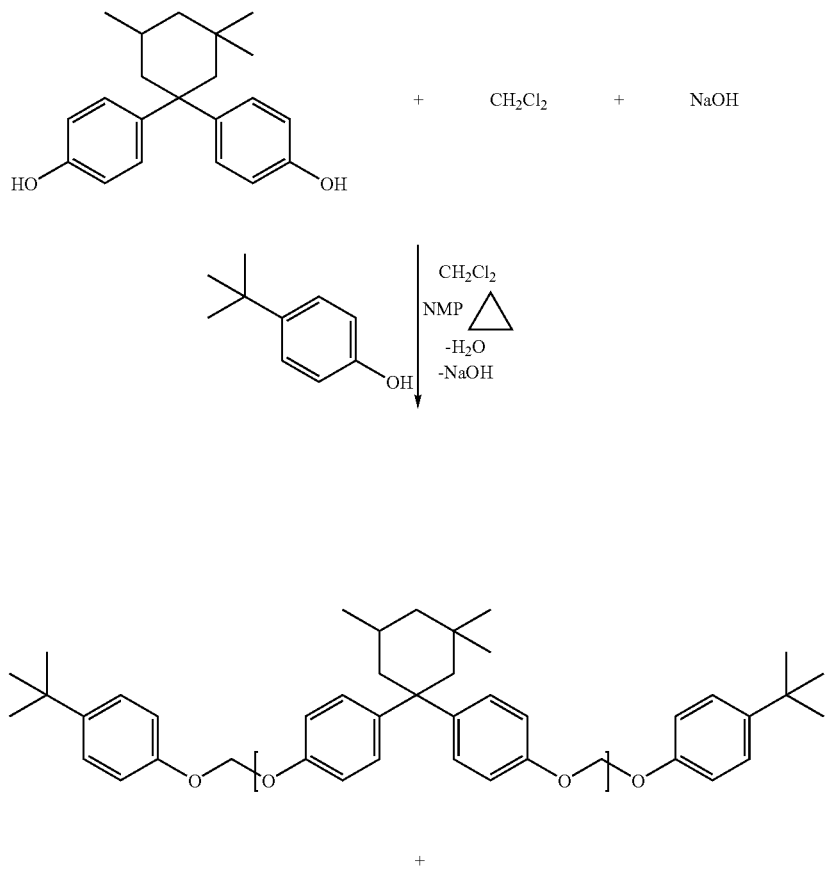

-continued

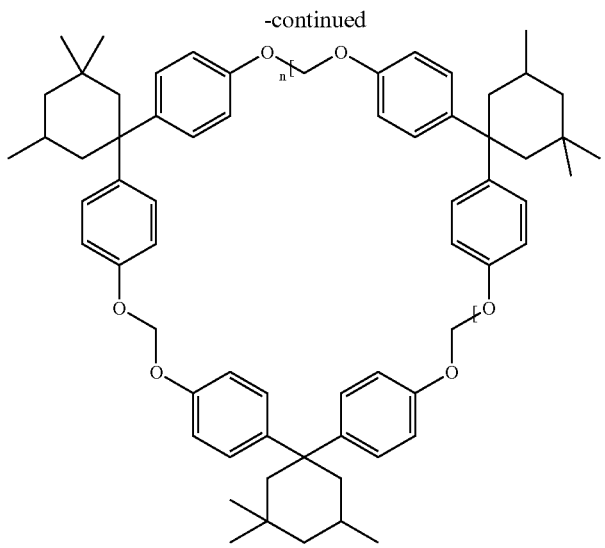

TMC:

5 kg (16.11 mol) of bisphenol TMC, 1.611 kg (40.28 mol) of sodium hydroxide flakes and 24.18 g (0.16 mol) of finely ground p-tert-butylphenol (Aldrich) in 500 ml of methylene chloride are added with stirring under a protective nitrogen atmosphere to a solvent mixture of 20.5 kg of methylene chloride and 28.7 kg of N-methyl-2-pyrrolidone (NMP). After homogenisation, the mixture is heated to reflux (78° C.) and stirred for one hour at this temperature. After cooling down to 25° C., the reaction batch is diluted with 35 l of methylene chloride and 20 l of demineralised water. The batch is washed with water in a separator until neutral and free of salt (conductivity <15 µS.cm$^{-1}$). The organic phase from the separator is separated and solvent exchange is performed in an evaporator tank, methylene chloride being replaced with chlorobenzene. The material is then extruded through a ZSK 32 devolatilizing extruder at a temperature of 280° C. with subsequent pelletization. After discarding the initial material, a total of 1.96 kg of a mixture of polyformal and cyclic oligoformal are consequently obtained as transparent pellets.

The main fraction obtained is treated in total 10 times in a kneader with 5 liter portions of acetone in order to separate the cyclic components. The combined acetone phases are evaporated to isolate the cyclic components. 290 g of product are obtained once the residue has been dried.

Analysis:
analysis by MALDI-TOF:
Instrument: Bruker Daltonic, Biflex III
The sample was investigated in linear mode.
Matrix: dithranol
Adduct former: LiCl MALDI-TOF (in dithranol as matrix/Li$^+$) reveals that the product only contains rings in the detectable size from three-membered rings (n=1) to 19-membered rings (n=17).

Example 2-9

Synthesis of Cyclic Co-oligoformals from Bisphenol TMC and Bisphenol A with Variable Composition Further formals are produced in a similar manner to the synthesis of Example 1 (c.f. Table 1). The cyclic components are likewise separated with acetone.

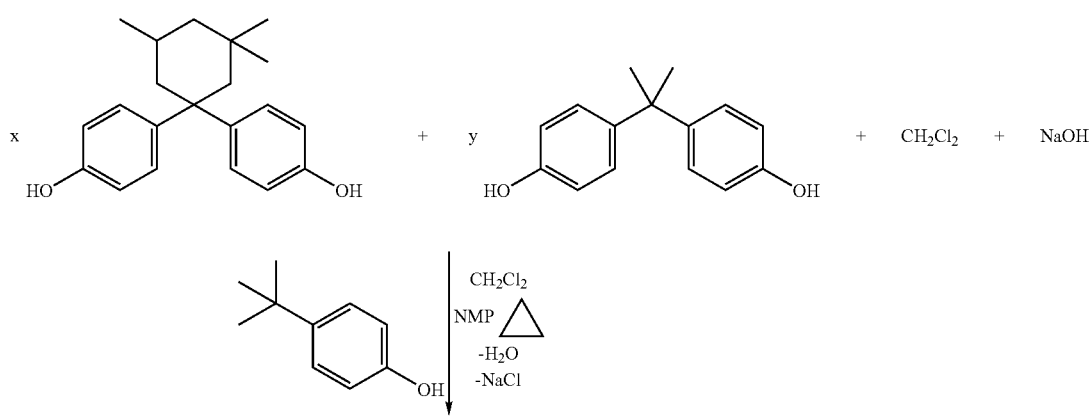

-continued

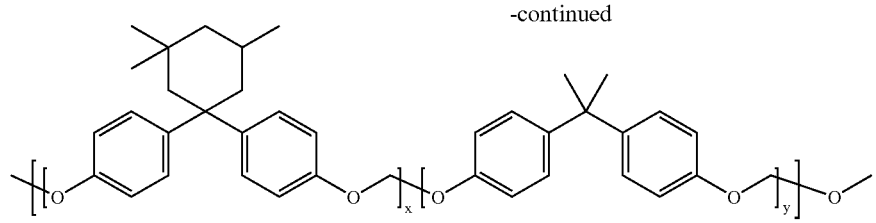

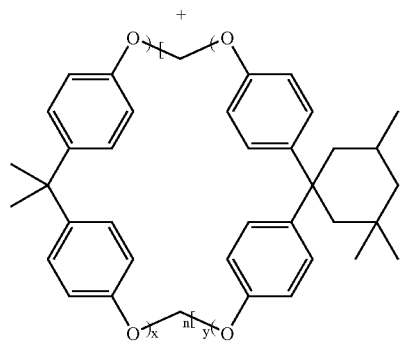

| Example no. | TMC [x mol %] | BPA [y mol %] |
|---|---|---|
| 2 | 30 | 70 |
| 3 | 35 | 65 |
| 4 | 40 | 60 |
| 5 | 50 | 50 |
| 6 | 55 | 45 |
| 7 | 70 | 30 |
| 8 | 80 | 20 |
| 9 | 90 | 10 |

Analysis:

MALDI-TOF (in dithranol as matrix/Li⁺) reveals that the product only contains rings in the detectable size from three-membered rings (n=2) to 19-membered rings (n=18).

Production of the Compositions

The educts are dissolved in methylene chloride. The homogeneous solution is evaporated to dryness and predried prior to processing in a mini injection molding machine. The injection molded strands obtained are used as the starting material for determining water absorption.

Water content or water absorption of the compositions is determined by storing the samples under moist conditions at 95% relative humidity and 30° C. Water content is determined immediately before introduction into the moist conditions and after 7 and 14 days by means of quantitative Karl-Fischer titration (coulometric titration) (mean value calculated in each case from 4 measurements).

TABLE 1

| | | Water content | | |
|---|---|---|---|---|
| Ex. | Composition | immediate | after 7 days [%] | after 14 days [%] |
| 10 | 98% BPA PC + 2% oligoformal from Example 1 | 0.06 | 0.25 | 0.25 |
| 11 | 98% Apec ® 1600 (copolycarbonate from Bayer AG) + 2% oligoformal from Example 1 | 0.06 | 0.24 | 0.25 |
| 12 | Comparison sample 1: Apec ® 1600 (copolycarbonate from Bayer AG) | 0.06 | 0.28 | 0.32 |
| 13 | Comparison sample 2: BPA PC | 0.05 | 0.33 | 0.33 |

1) BPA PC = polycarbonate based on bisphenol A, melt flow rate at 300° C., 1.2 kg = 63 g/10 min, Tg 145° C.]

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising at least one resinous component selected from the group consisting of homopolycarbonate, copolycarbonate and polyester carbonate and 10 to 60,000 ppm relative to the resinous component of at least one cyclic oligoformal of the formula (1)

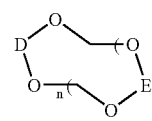

(1)

in which the residue O-D-O or O-E-O independently denotes randomly incorporated member selected from the group consisting of hydroquinone, resorcinol, dihydroxybiphenyls, bis(hydroxyphenyl)alkanes, bis(hydroxyphenyl)cycloalkanes, bis(hydroxyphenyl) sulfides, bis(hydroxyphenyl) ethers, bis(hydroxyphenyl) ketones, bis(hydroxyphenyl) sulfones, bis(hydroxyphenyl) sulfoxides, α,α'-bis(hydroxyphenyl)diisopropylbenzenes, the ring-alkylated compounds thereof, and α,ω-bis(hydroxyphenyl)polysiloxanes, said D and E differ one from the other and n denotes 3 to 25.

2. The composition according to claim 1, wherein the polycarbonate has a weight average molecular weight of 15,000 to 35,000.

3. The composition according to claim 1, wherein the molar ratio of D to E is 95:5-5:95.

4. The composition according to claim 1 further comprising at least one conventional additive for polycarbonate.

5. A molded article comprising the composition of claim 1.

6. An optical data storage medium comprising the composition of claim 1.

7. The composition of claim 1 wherein the amount of oligoformal is 10 to 50,000 ppm.

8. The composition of claim 1 wherein the amount of oligoformal is 20 to 40,000 ppm.

9. The composition of claim 1 wherein the amount of oligoformal is 50 to 35,000 ppm.

10. The composition of claim 1 wherein the amount of oligoformal is 1000 to 30,000 ppm.

11. The composition of claim 1 wherein the amount of oligoformal is 10 to 1000 ppm.

12. The composition of claim 1 wherein said D is the residue of 1,1-bis(4-hydroxyphenyl)-3,3,5-trimethylcyclohexane.

13. The composition of claim 1 wherein said E is the residue of a member selected from the group consisting of 4,4'-dihydroxybiphenyl, 2,2-bis(4-hydroxyphenyl)propane, 1,1-bis(4-hydroxyphenyl)-3,3,5-trimethylcyclo-hexane, 1,1-bis(4-hydroxyphenyl)cyclohexane, 2,4-bis(4-hydroxyphenyl)-2-methyl-butane, 1,1-bis(4-hydroxyphenyl)-1-phenylethane, 1,1-1,4-bis[2-(4-hydroxyphenyl)-2-propyl]benzene, 1,3-bis[2-(4-hydroxyphenyl)-2-propyl]benzene, 2,2-bis(3-methyl-4-hydroxyphenyl)propane, 2,2-bis(3-chloro-4-hydroxyphenyl)propane, bis(3,5-dimethyl-4-hydroxyphenyl) methane, 2,2-bis(3,5-dimethyl-4-hydroxyphenyl)propane, bis(3,5-dimethyl-4-hydroxyphenyl) sulfone and 2,4-bis(3,5-dimethyl-4-hydroxyphenyl)-2-methylbutane.

14. The composition of claim 13 wherein said E is the residue of a member selected from the group consisting of 4,4'-dihydroxybiphenyl, 2,2-bis(4-hydroxyphenyl)propane, 1,1-bis(4-hydroxyphenyl)-3,3,5-trimethylcyclo-hexane, 1,1-bis(4-hydroxyphenyl)cyclohexane, 2,4-bis(4-hydroxyphenyl)-2-methyl-butane, 1,1-bis(4-hydroxyphenyl)-1-phenylethane, 1,1-1,4-bis[2-(4-hydroxyphenyl)-2-propyl]benzene, 1,3-bis[2-(4-hydroxyphenyl)-2-propyl]benzene, 2,2-bis(3-methyl-4-hydroxyphenyl)propane, bis(3,5-dimethyl-4-hydroxyphenyl)methane, 2,2-bis(3,5-dimethyl-4-hydroxyphenyl)propane, bis(3,5-dimethyl-4-hydroxyphenyl) sulfone and 2,4-bis(3,5-dimethyl-4-hydroxyphenyl)-2-methylbutane.

15. A thermoplastic molding composition comprising at least one resinous component selected from the group consisting of homopolycarbonate, copolycarbonate and polyester carbonate and 10 to 60,000 ppm relative to the resinous component of at least one cyclic oligoformal conforming to formula (4b)

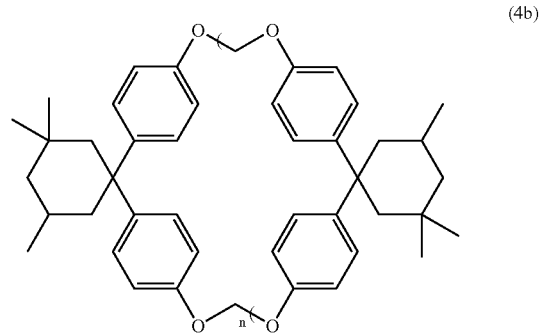

(4b)

wherein n denotes 3 to 25.

16. A thermoplastic molding composition comprising at least one resinous component selected from the group consisting of homopolycarbonate, copolycarbonate and polyester carbonate and 10 to 60,000 ppm relative to the resinous component of at least one cyclic oligoformal conforming to formula (4c)

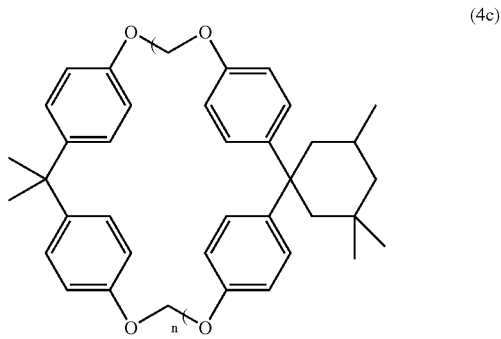

(4c)

wherein n denotes 3 to 25.

* * * * *